United States Patent
Rothschild et al.

(10) Patent No.: US 12,289,299 B2
(45) Date of Patent: Apr. 29, 2025

(54) AUTOMATED SHARING OF REMOTE DEVICES BY MULTIPLE USERS USING A FILE SYSTEM

(71) Applicant: Dell Products L.P., Round Rock, TX (US)

(72) Inventors: Seth Rothschild, Littleton, MA (US); Benjamin Edward Santaus, Somerville, MA (US); Dale R. Bremner, Wrentham, MA (US)

(73) Assignee: Dell Products L.P., Round Rock, TX (US)

( * ) Notice: Subject to any disclaimer, the term of this patent is extended or adjusted under 35 U.S.C. 154(b) by 329 days.

(21) Appl. No.: 17/903,548

(22) Filed: Sep. 6, 2022

(65) Prior Publication Data

US 2024/0080306 A1 Mar. 7, 2024

(51) Int. Cl.
*H04L 9/40* (2022.01)
*G06F 16/182* (2019.01)

(52) U.S. Cl.
CPC ...... *H04L 63/0442* (2013.01); *G06F 16/1824* (2019.01); *H04L 63/0815* (2013.01); *H04L 63/168* (2013.01)

(58) Field of Classification Search
CPC ............. H04L 63/0442; H04L 63/0815; H04L 63/168; G06F 16/1824
See application file for complete search history.

(56) References Cited

U.S. PATENT DOCUMENTS

| 8,613,070 B1 * | 12/2013 | Borzycki | H04L 67/104 726/8 |
| 2015/0121066 A1 * | 4/2015 | Nix | H04L 9/3247 713/155 |
| 2021/0377253 A1 | 12/2021 | Robbins et al. | |

OTHER PUBLICATIONS

"Network Information Service"; https://www.ibm.com/docs/en/aix/7.1?topic=guide-network-information-service, downloaded on Aug. 30, 2022.

"Creating a User Homer directory when you use LDAP Authentication"; https://www.redbooks.ibm.com/abstracts/tips0410.html, downloaded on Aug. 30, 2022.

(Continued)

*Primary Examiner* — Paul E Callahan
(74) *Attorney, Agent, or Firm* — Ryan, Mason & Lewis, LLP

(57) ABSTRACT

Techniques are provided for automated sharing of remote devices by multiple users using a file system. One method comprises maintaining public keys for source devices associated with users; configuring a primary target device to provide a file system that comprises: (i) a user-specific directory for each of the users, and (ii) a global directory accessible by the users, wherein the user-specific directory for a given user comprises the public key for the source devices associated with the given user; and configuring a secondary target device to provide a copy of the file system, wherein updates to the file system are provided to the secondary target device, and wherein the given user accesses the primary and/or the secondary target device, using a particular source device, based on an evaluation of the (Continued)

public key for the particular source device obtained from the user-specific directory for the given user.

20 Claims, 11 Drawing Sheets

(56) References Cited

OTHER PUBLICATIONS

Loshin, Peter, "Network File System (NFS)"; https://www.techtarget.com/searchenterprisedesktop/definition/Network-File-System, downloaded on Aug. 30, 2022.
"What is VDI (Virtual Desktop Infrastructure)?"; https://www.vmware.com/topics/glossary/content/virtual-desktop-infrastructure-vdi.html, downloaded on Aug. 30, 2022.
"SSH Protocol"; https://www.ssh.com/ssh/protocol/, downloaded on Aug. 30, 2022.

* cited by examiner

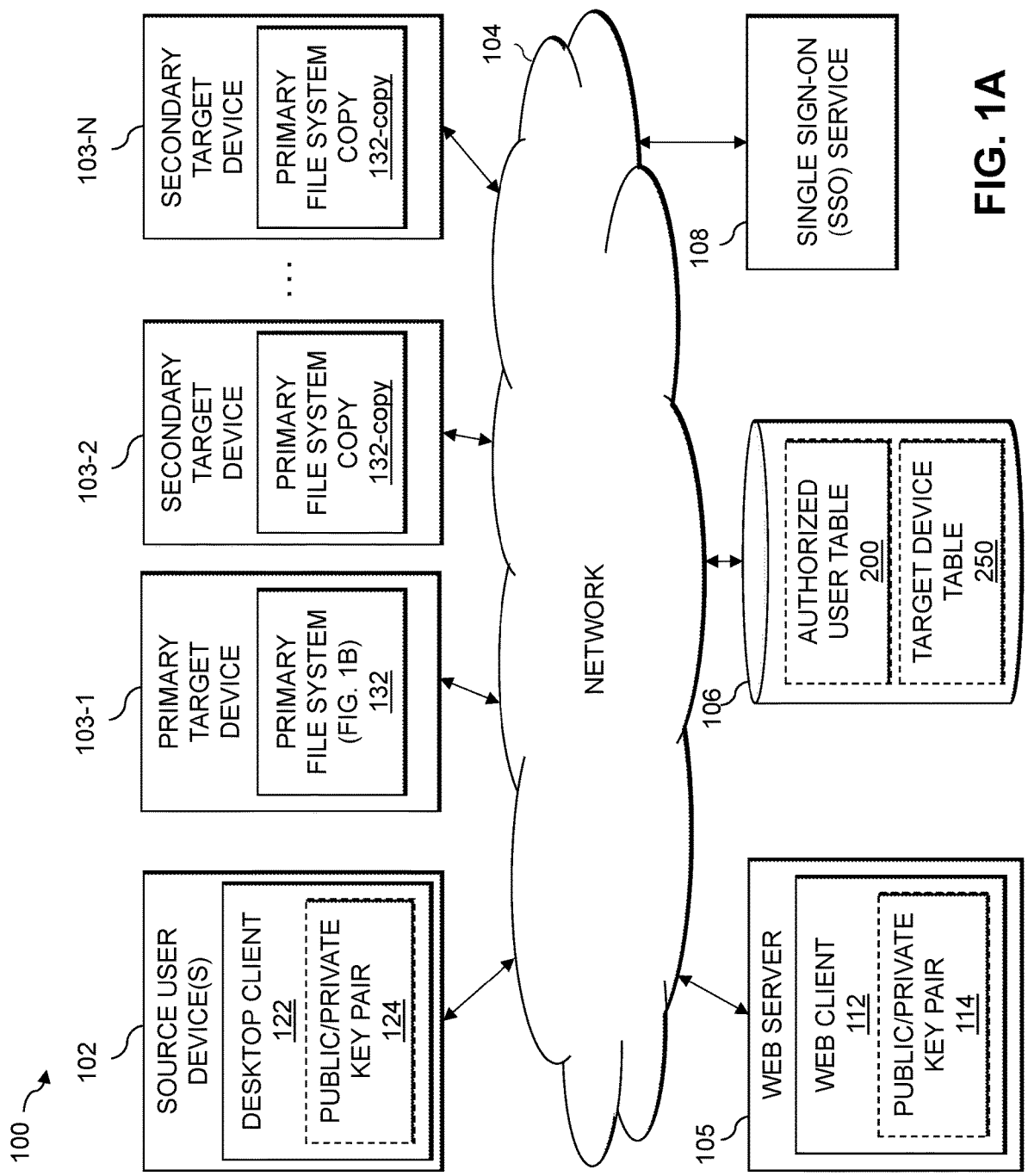

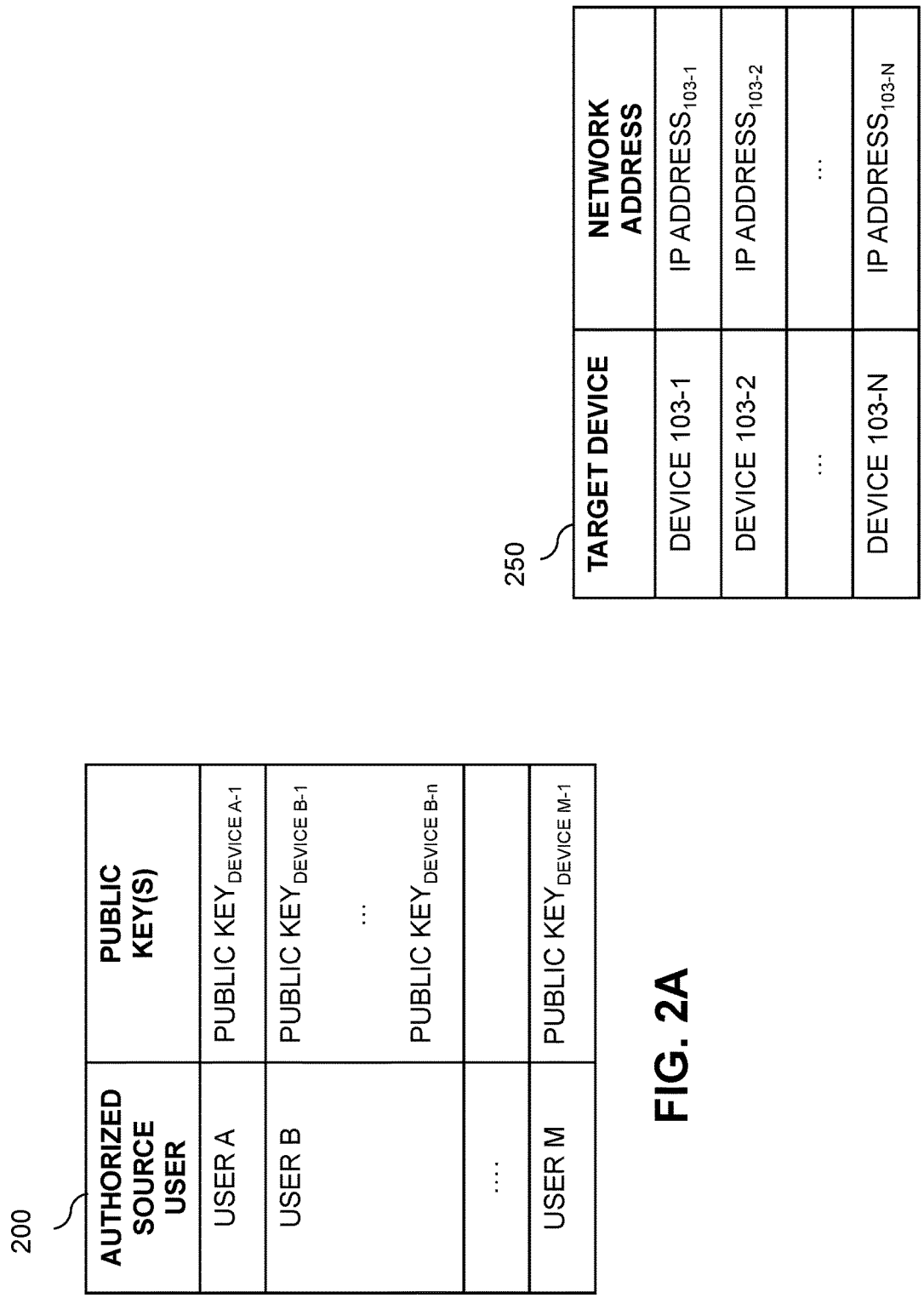

| AUTHORIZED KEYS FILE 300 (USER B) ||
| --- | --- |
| USER IDENTIFIER | PUBLIC KEY |
| WEB CLIENT $WC_1$ | PUBLIC KEY$_{WC1}$ |
| USER DEVICE B-1 | PUBLIC KEY$_{DEVICE\ B-1}$ |
| ... | ... |
| USER DEVICE B-n | PUBLIC KEY$_{DEVICE\ B-n}$ |

FIG. 3

WEB CLIENT PROCESS 500

SOURCE USER LOGS ON USING DESKTOP CLIENT 122 OF A SOURCE USER DEVICE 102;

EXECUTE SINGLE SIGN-ON SERVICE TO CREATE SESSION FOR DESKTOP CLIENT 122;

CONFIRM THAT SOURCE USER IS AN AUTHORIZED SOURCE USER IN TABLE 200;

IN RESPONSE TO A SOURCE USER REQUEST TO ACCESS A SELECTED TARGET DEVICE:

RECEIVE PUBLIC KEY OF SOURCE USER DEVICE 102 FROM CONFIGURATION FILE OF DESKTOP CLIENT 122 FOR REDISTRIBUTION;

CREATE A NEW USER ON THE PRIMARY TARGET DEVICE, IF NEEDED, FOR SOURCE USER AND MOUNT A USER FOLDER FOR NEW SOURCE USER IN THE USER HOME DIRECTORIES 150 OF THE PRIMARY FILE SYSTEM OF PRIMARY TARGET DEVICE; AND

TRANSFER PUBLIC KEY OF SOURCE USER DEVICE 102 OF NEW SOURCE USER TO THE AUTHORIZED KEYS FILE IN THE USER HOME DIRECTORY IN THE PRIMARY TARGET DEVICE TO BE AUTOMATICALLY COPIED TO SECONDARY TARGET DEVICES

FIG. 5

DESKTOP CLIENT PROCESS 600

SOURCE USER LOGS ON TO WEB CLIENT 112 USING DESKTOP CLIENT 122 OF SOURCE USER DEVICE 102 TO CREATE SINGLE SIGN-ON SESSION FOR DESKTOP CLIENT 122;

GENERATE PUBLIC/PRIVATE KEY PAIR FOR SOURCE USER DEVICE 102;

SEND PUBLIC KEY OF SOURCE USER DEVICE 102 TO WEB CLIENT 112 FOR STORAGE IN AUTHORIZED KEYS FILE ASSOCIATED WITH THE SOURCE USER; AND

UPDATE REMOTE CONFIGURATION FILE OF SOURCE USER DEVICE 102 TO USE GENERATED PRIVATE KEY AS IDENTITY FILE FOR SECURE REMOTE CONNECTION PROTOCOL AND TO INCLUDE IP ADDRESSES AND USER IDENTIFIERS FOR TARGET DEVICES 103.

FIG. 6

AUTOMATED SHARING OF REMOTE DEVICES BY MULTIPLE USERS USING A FILE SYSTEM

FIELD

The field relates generally to information processing, and more particularly, to the connection of devices over a network.

BACKGROUND

Manually setting up a connection from a first device to multiple remote devices (such as multiple remote servers) over a network using a secure remote connection protocol can be a tedious and error prone process, particularly when such access requires generation of a public/private key pair. One example of a secure remote connection protocol is the SSH (Secure Shell) protocol. A need exists for automated techniques for connecting multiple users to multiple remote devices over a network.

SUMMARY

In one embodiment, a method comprises maintaining at least one data record comprising a public key for each of one or more source devices associated with respective ones of a plurality of users; configuring a primary target device to provide a file system that comprises: (i) a user-specific directory for each of the plurality of users, and (ii) at least one global directory accessible by at least some of the plurality of users, wherein the user-specific directory for a given user comprises the public key for each of the one or more source devices associated with the given user and at least one user-specific file for the given user; and configuring at least one secondary target device to provide a copy of at least a portion of the file system, wherein one or more updates to the file system are automatically provided to the at least one secondary target device, and wherein the given user accesses one or more of the primary target device and the at least one secondary target device, using a particular source device associated with the given user, based at least in part on an evaluation of the public key for the particular source device obtained from the user-specific directory for the given user.

In some embodiments, an authorized user data record is maintained that identifies a plurality of authorized users and the user-specific directory is automatically created in the file system for each of the plurality of authorized users.

In one or more embodiments, one or more activities of the given user on one or more of the primary target device and the at least one secondary target device are automatically tracked separately from one or more activities of at least one additional user. The one or more activities of the given user may be automatically tracked using a logging script executed on the primary target device and the at least one secondary target device to capture activities of each active user since a prior log event.

Other illustrative embodiments include, without limitation, apparatus, systems, methods and computer program products comprising processor-readable storage media.

BRIEF DESCRIPTION OF THE DRAWINGS

FIG. 1A shows a computer network configured for automated sharing of remote devices by multiple users using a file system, in accordance with an illustrative embodiment;

FIGS. 2A and 2B illustrate the authorized user table and the target device table, respectively, of FIG. 1A in accordance with some embodiments;

FIG. 3 is a sample table of an exemplary authorized keys file of FIG. 1B in accordance with an illustrative embodiment;

FIG. 5 illustrates exemplary pseudo code for a web client process, in accordance with an illustrative embodiment;

FIG. 6 illustrates exemplary pseudo code for a desktop client process, in accordance with an illustrative embodiment;

DETAILED DESCRIPTION

Figure 1B:
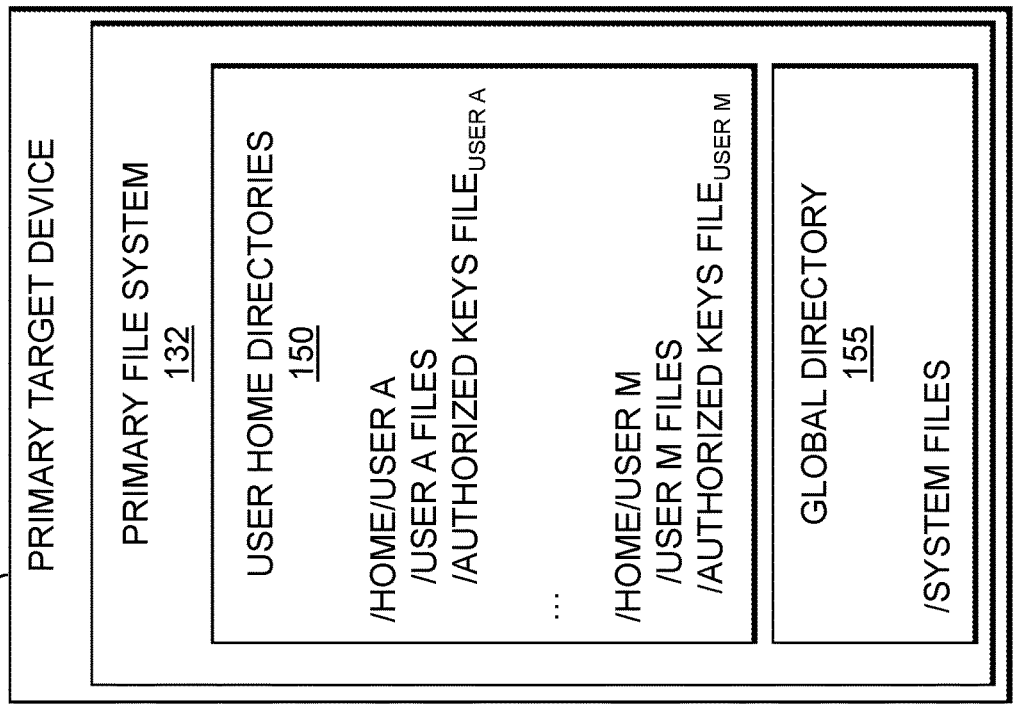
FIG. 1B shows the primary target device of FIG. 1A in further detail, in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for automated sharing of remote devices by multiple users using a file system. Single sign-on is an authentication scheme that allows users to access multiple independent systems, typically using a single user identifier and password.

Software development and/or information technology engineers (sometimes collectively referred to as DevOps engineers) often choose between working on software code locally, for example, on their dedicated laptop, or remotely, for example, on a server in a datacenter or in the cloud.

One or more aspects of the disclosure recognize that there are a number of advantages to performing such tasks using a shared, remote device. For example, the software code and development environment are accessible to multiple users (e.g., with all of the software dependencies in place). In addition, such shared, remote devices are often located in environments that ensure that only authorized users (e.g., having a certain level of access) can access the stored information, and that employ best practices, such as performing regular and/or on-demand backups of the stored information. Further, authorized users can log on to any remote device and expect a uniform or standardized configuration for performing their work.

Such DevOps engineers often need to work on remote devices. The DevOps engineers may connect to the remote devices using a secure remote connection protocol, such as the SSH-1 or SSH-2 protocols (sometimes referred to as Secure Shell (SSH)). OpenSSH is an exemplary implementation of SSH-2. SSH is a protocol by which a client can connect remotely to a host, sometimes called the server, or another remote device. Communications between the two devices in an SSH session are encrypted.

United States Published Patent Application No. 2021/0377253, filed May 29, 2020, entitled "Automated Key Management for Remote Devices Using Single Sign-On Techniques," incorporated by reference herein in its entirety, provides a key management platform that allows users to access remote machines securely using a single sign-on.

Nonetheless, there are still technical challenges with deploying and maintaining new remote devices. For example, there may be a tendency for DevOps engineers to deploy a new remote device having only a single user account, with a weak password shared by multiple users. In addition, there are challenges associated with tracking and/or logging the activities of multiple users on such remote devices when a single password is shared by multiple users.

In one or more embodiments, techniques are provided for automated sharing of remote devices by multiple users using a file system. For example, for remote devices used by DevOps engineers, a development environment can be created on a primary remote device and the development environment can be automatically shared from the primary remote device across one or more secondary remote devices. In this manner, each individual user does not need to install software dependencies in order to work on the software code of a DevOps team, for example, In addition, each authorized user is provided with a unique user account and a corresponding dedicated home directory for personal and/or user-specific files (e.g., user-specific macros for creating and editing text). In this manner, users have an incentive to practice good security behavior. In addition, each user can be separately tracked and/or logged more easily, relative to a single shared account.

While one or more embodiments are described herein in the context of a software development environment, the disclosed automated remote device sharing techniques may be applied in any environment where a remote device is shared by multiple users. Thus, a software development server, for example, is one example of what is more generally referred to herein as a target device. Accordingly, the term "target device," as used herein, is intended to be broadly construed, so as to encompass, for example, any of a wide variety of remote devices shared by multiple users, as would be apparent to a person of ordinary skill in the art.

FIG. 1A shows a computer network (also referred to herein as an information processing system) 100 configured in accordance with an illustrative embodiment. The computer network 100 comprises one or more source user devices 102, and a plurality of target devices 103-1 through 103-N, collectively referred to herein as target devices 103. In the example of FIG. 1, the target devices 103 comprise one primary target device 103-1 and one or more secondary target devices 103-2 through 103-N.

The source user devices 102 and the target devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1A embodiment. Also coupled to network 104 is web server 105 and a single sign-on (SSO) service 108.

The source user devices 102 and/or the target devices 103 may comprise, for example, mobile telephones, host devices, laptop computers, tablet computers, desktop computers or other types of computing devices. Such devices are examples of what are more generally referred to herein as "processing devices." Some of these processing devices are also generally referred to herein as "computers."

The target devices 103 in some embodiments may be implemented as shared software development servers.

The source user devices 102 and/or the target devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The web server 105 may be implemented, for example, as a Platform-as-a-Service (PaaS) server, and further comprises a web client 112 that manages a public/private key pair 114 for the web client 112. The web client 112 can employ networking capabilities such as ethernet, Wi-Fi, etc. In asymmetric key cryptography, for example, a user will often generate two files, known as a public key and a private key. A public key can be freely distributed. The public key can then be used to encrypt data which can only be decrypted by the owner of the private key. These pairs can also be used for public key authentication.

The source user devices 102 further comprise a desktop client 122 that manages a public/private key pair 124 for the desktop client 122. The desktop client 122 can employ networking capabilities such as ethernet, Wi-Fi, etc. The source user devices 102 are examples of what are more generally referred to herein as source devices.

The primary target device 103-1 comprises a primary file system 132, as discussed further below in conjunction with FIG. 1B. In addition, the secondary target devices 103-2 through 103-N comprise copies 132-copy of the primary file system 132. In one or more embodiments, the primary file system 132 and the copies 132-copy of the primary file system 132 are implemented using network file system (NFS) sharing. As discussed herein, in at least some embodiments, changes to the primary file system 132 of the primary target device 103-1 are automatically updated in the copies 132-copy of the primary file system 132.

The target devices 103 can employ networking capabilities such as ethernet, Wi-Fi, etc. In some embodiments, the target devices 103 employ logging functionality, such that the activities of all users on the target devices 103 are logged separately for each respective user by the respective target device 103. For example, a logging script can be executed on each target device 103, for example, every minute to capture the user activities since the prior log event. The logging script can manage a list of active terminal sessions open on each target device 103, as well as a list comprising past sessions within a given timeframe.

The public key of the public/private key pair 114 for the web client 112 should be put in an authorized keys file of each user of the FIG. 1A system, as discussed further below in conjunction with FIG. 3. By doing this, the web client 112 will use its access to distribute access to the source user devices 102. In addition, the public key of the public/private key pair 124 for the desktop client 122 for each source user device 102 used by a given user should be put in the authorized keys file of the given user of the FIG. 1A system.

It is to be appreciated that this particular arrangement of desktop client 122 and web client 112 illustrated in source user devices 102 and web server 105, respectively, of the FIG. 1A embodiment is presented by way of example only, and alternative arrangements can be used in other embodiments. For example, the functionality associated with the desktop client 122 and the web client 112 in other embodiments can be combined into a single software entity, or separated across a larger number of software entities. As another example, multiple distinct processors can be used to implement different ones of software entities 122 and 112 or portions thereof. At least portions of software entities 122 and 112 may be implemented at least in part in the form of software that is stored in memory and executed by a processor.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, in the example of FIG. 1A, the web server 105 can access an associated database 106 configured to store an authorized user table 200 and a target device table 250, as discussed further below in conjunction with FIGS. 2A and 2B, respectively.

The database 106 in the present embodiment is implemented using one or more storage systems accessible to the web server 105 through the network 104. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the web server 105, for example, can be one or more input-output devices, which illustratively comprise keyboards, displays or other types of input-output devices in any combination. Such input-output devices can be used, for example, to support one or more user interfaces to the web server 105, as well as to support communication between the web server 105 and other related systems and devices, such as source user devices 102 and target devices 103.

The source user devices 102, target devices 103 and the web server 105 in the FIG. 1A embodiment are assumed to be implemented using at least one processing device. Each such processing device generally comprises at least one processor and an associated memory, and implements one or more functional modules for controlling certain features of the web server 105.

More particularly, source user devices 102, target devices 103 and web server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

A network interface allows the source user devices 102, target devices 103 and/or the web server 105 to communicate over the network 104 with each other (as well as one or more other networked devices), and illustratively comprises one or more conventional transceivers.

It is to be understood that the particular set of elements shown in FIG. 1A for automated sharing of target devices 103 by multiple users using a file system and single sign-on techniques involving source user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing web client 112 and/or desktop client 122 of an example web server 105 and source user devices 102, respectively, in computer network 100 will be described in more detail with reference to, for example, FIGS. 5 and 6.

In some embodiments, the user of a source user device 102 opens the desktop client 122 and initiates a log in process, such as by clicking a "Log In" button on a user interface. The log in process executes a single sign-on route on the web client 112 on a web server 105 where the web client 112 is hosted. The web client 112 is connected to a single sign-on service 108 provided for a given company. The single sign-on route verifies which user signed in and creates a session for the desktop client 122 so that the user does not need to sign in again. The concept of a session is secure and well known and is outside the scope of the present disclosure, as would be apparent to a person of ordinary skill in the art. From this point forward, both the desktop client 122 and the web client 112 agree on who the user is. If the session ends, the user will be required to log in again.

FIG. 1B shows the primary target device 103-1 of FIG. 1A in further detail, in accordance with an illustrative embodiment. In the example of FIG. 1B, the primary target device 103-1 comprises a primary file system 132 that may be implemented using an NFS, as noted above. The primary file system 132 comprises user home directories 150 and a global directory 155 comprising one or more system files.

The user home directories 150 and global directory 155, and any updates thereto, are automatically shared from the primary file system 132 to the copies 132-copy of the primary file system 132 on the secondary target devices 103-2 through 103-N using, for example, NFS or a Samba software package (e.g., a configuration sharing function and/or configuration scripts). In some embodiments, NFS may perform continuous updates to replicate any changes to the primary file system 132 to the copies 132-copy of the primary file system 132 on the secondary target devices 103-2 through 103-N (and vice versa), for example, using an encrypted tunnel (e.g., with continuous two-way updates).

The user home directories 150 of FIG. 1 comprise a directory (e.g., a home directory) for each authorized source user. Each user directory comprises the user-specific files (e.g., personal files) of the respective user, and an authorized keys file of the respective user, as discussed further below in conjunction with FIG. 3. In at least in some embodiments, one authorized keys file is maintained for each user identifying the public keys of one or more source user devices associated with the respective user.

The global directory 155 of FIG. 1 comprises the installed global software (e.g., system files and other operating files for system operation, such as software programs and binary files) and a directory of authorized source users (e.g., in the form of the authorized user table 200 of FIG. 2A). For example, in a software development environment, the global directory 155 may comprise a set of software development tools used to develop, deploy and/or maintain software code.

As discussed further below in conjunction with FIG. 2B, once a new secondary target device is added and configured in the system 100, a copy 132-copy of the primary file system 132 is mounted on the new secondary target device.

In some embodiments, the primary target device 103-1 comprises references to the secondary target devices 103-2 through 103-N, and stores files and configuration information of the secondary target devices 103-2 through 103-N.

FIG. 2A illustrates the authorized user table 200 of FIG. 1A in accordance with one embodiment. In the example of FIG. 2A, the authorized user table 200 identifies the authorized source users together with the public keys of the one or more source user devices used by each respective user. In at least some embodiments, the public key of a given source user device only grants access to a target device to the particular source user associated with the given source user device. The authorized user table 200 may be stored, for example, in the database 106 of FIG. 1A and accessed by the web client 112 of the web server 105 to obtain the public keys of the authorized source users to set up the authorized keys file for each source user in the primary file system 132, as discussed further below in conjunction with, for example, FIGS. 3 and 5.

FIG. 2B illustrates the target device table 250 of FIG. 1A in accordance with an embodiment. In the example of FIG. 2B, the target device table 250 identifies each target device 103 and the corresponding network address (e.g., an IP address) of each target device 103. The indicated network addresses can be used, for example, by the desktop clients of the source user devices 102 to find a particular target device 103 on the network 104.

When a user, such as an administrator, requests to add a new target device 103, the web client 112 adds the network address of the new target device 103 into the target device table 250 along with a device name of the new target device 103 by running configuration scripts on the new target device 103 and creating a user account for the web client 112 with the appropriate privileges.

In one or more embodiments, after generating a key, a desktop client 122 will update the remote connection configuration file on the corresponding source user device 102 (e.g., the SSH configuration file) in an operating system appropriate way so that the desktop client 122 can use the newly generated private key as an identity file. The configuration file, in some embodiments, has information about how to connect to certain devices. While it is possible to manually enter arguments for SSH without writing a configuration file, the existence of a configuration file makes it easier for a user to connect. For example, the stored information may include the IP address of the target device 103, the user identifier on the target device 103 and the location of the private key to be used as an identity file for the target device 103.

The configuration file can also be updated in some embodiments to include IP addresses and user identifiers for the target devices 103 that the source user is authorized to access. This last step can make the representative SSH process simpler, but is not necessarily required for the disclosed key management techniques to function, as the user identifier, IP address, and identity file could be included as command line arguments to the SSH command in further variations, as would be apparent to a person of ordinary skill in the art.

Note that having a correctly configured SSH configuration file is insufficient by itself to grant access, in the same way that knowing where a door is, is not enough to unlock the door. However, the public key of the source user device 102 has been stored in the authorized keys file of the respective user on the target devices 103 through the web client 112, which allows the source user device 102 to access the target devices 103. In this manner, the source user devices 102 are now configured to connect via SSH in some embodiments without the user interacting with public/private key pairs 124, configuration files or IP addresses.

FIG. 3 is a sample table of an exemplary authorized keys file 300 of a given user, such as user B listed in the authorized user table 200 of FIG. 2A, according to one or more embodiments. As noted above, the primary file systems (e.g., 132 and 132-copy) of the target devices 103 further comprise the authorized keys file 300 in each of the user home directories 150 for storing public keys of authorized source user devices 102. In the example of FIG. 3, a separate authorized keys file 300 is maintained for each authorized source user.

As shown in FIG. 3, the exemplary authorized keys file 300 is associated with user B of the authorized user table 200 of FIG. 2A. The exemplary authorized keys file 300 comprises a user identifier of one or more web clients (WC) and one or more source user devices for user B, such as source user devices B-1 through B-n, that were entered by the respective web client WC, such as web client $WC_1$. For each source user device B-i, the exemplary authorized keys file 300 also identifies the corresponding public key, PUBLIC $KEY_{DEVICEB-i}$.

Figure 4:
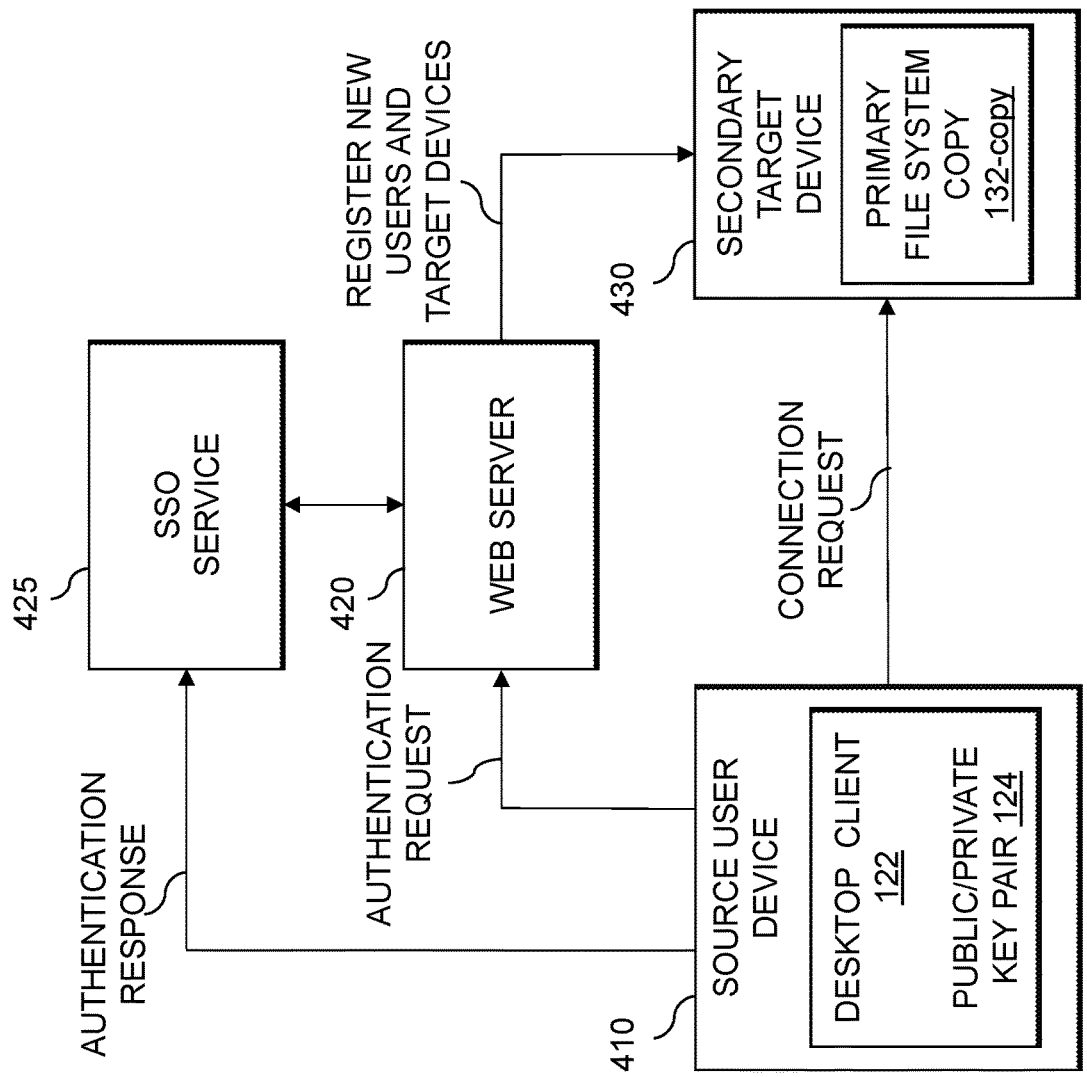
FIG. 4 illustrates a computer network configured for single sign-on authentication and an automated sharing of one or more remote devices by multiple users, in accordance with an illustrative embodiment.

FIG. 4 illustrates a computer network configured for single sign-on authentication and an automated sharing of remote devices by multiple users using a file system, in accordance with an illustrative embodiment. In the example of FIG. 4, a source user device 410 submits an authentication request to a web server 420, which redirects the authentication request to an SSO service 425 for authentication of the source user device 410. In at least some embodiments, the distribution of access control keys by the SSO service 425 may be performed, at least in part, in accordance with the SSO techniques described in United States Published Patent Application No. 2021/0377253, incorporated by reference herein above.

In the embodiment of FIG. 4, the web server 420 registers new users and new target devices with a desired target device, such as secondary target device 430. In some embodiments, a new user account is created for each individual user that is authorized to access the target devices (e.g., for authorized source users identified in the authorized user table 200). A/home folder (e.g., /home/user B) is mounted into the user home directory 150 (FIG. 1B) of at least one target device for each new user. The/home folder of each new user comprises the user-specific files and the authorized keys file for each respective new user, as discussed above in conjunction with FIG. 1B. The/home folder of each new user is then copied into the file system of the remaining target devices. In this manner, the/home folder mounted by the web server 420 for each new user is automatically distributed to multiple target devices, in at least some embodiments.

In addition, once a given new user has authenticated to the SSO service 425, using the source user device 410, as discussed further below in conjunction with FIG. 7, for example, and the web server 420 has registered the given new user in the manner described above, the given new user can send a connection request to a desired secondary target device 430, which will have a copy of the primary file system 132-copy (which now comprises the/home folder for the given new user).

The processing of the connection request from the given new user to the desired secondary target device 430 is discussed further below in conjunction with FIGS. 5 and 6, for example, FIG. 5 illustrates exemplary pseudo code for a web client process 500, according to one embodiment of the disclosure. As shown in FIG. 5, the exemplary web client process 500 comprises the following functionality that is performed by a given web client 112 after a source user logs on using a desktop client 122 of a source user device 102. The web client process 500 initially executes a single sign-on service to create a session for the desktop client 122 and then confirms that the source user is an authorized source user in the authorized user table 200.

In response to a source user request to access a selected target device 103, the exemplary web client process 500 performs the following steps:
 receive the public key of the source user device 102 from the configuration file of the desktop client 122 for redistribution;
 create a new user on the primary target device, if needed, for the source user and mount a user folder for the new source user in the user home directories 150 of the primary file system 132 of the primary target device 103-1; and
 transfer the public key of the source user device 102 of the new source user to the authorized keys file in the user home directory in the primary target device 103-1 for the new source user to be automatically copied to the secondary target devices.

The manner in which the source user device 102 accesses the selected target device 103, after the public key of the source user device 102 has been stored by the web client 112 in the authorized keys file of the source user, is discussed further below in conjunction with FIG. 7.

FIG. 6 illustrates exemplary pseudo code for a desktop client process 600, according to one embodiment of the disclosure. As shown in FIG. 6, the exemplary desktop client process 600 comprises the following functionality that is performed by a given desktop client 122 when a source user logs on to a web client 112 using the desktop client 122 of a given source user device 102 to create a single sign-on session for the desktop client 122. The desktop client process 600 then generates a public/private key pair for the given source user device 102 and sends the public key of the source user device 102 to the web client 112 for storage in the authorized keys file associated with the given user.

The desktop client process 600 then updates the remote configuration file of the given source user device 102 to use the generated private key as an identity file for a secure remote connection protocol (e.g., SSH) and to include the IP addresses and user identifiers for the target devices 103.

Generally, the identity file is a private key being used in public key authentication. The target device 103 will be given the public key and can then verify that a desktop client 122 has the associated private key. The private key is sometimes called an identity file when it is used in this way.

In some embodiments, the desktop client process 600 may comprise administrative functionality to allow a user to view the activity logs associated with one or more of the target devices 103.

Figure 7:
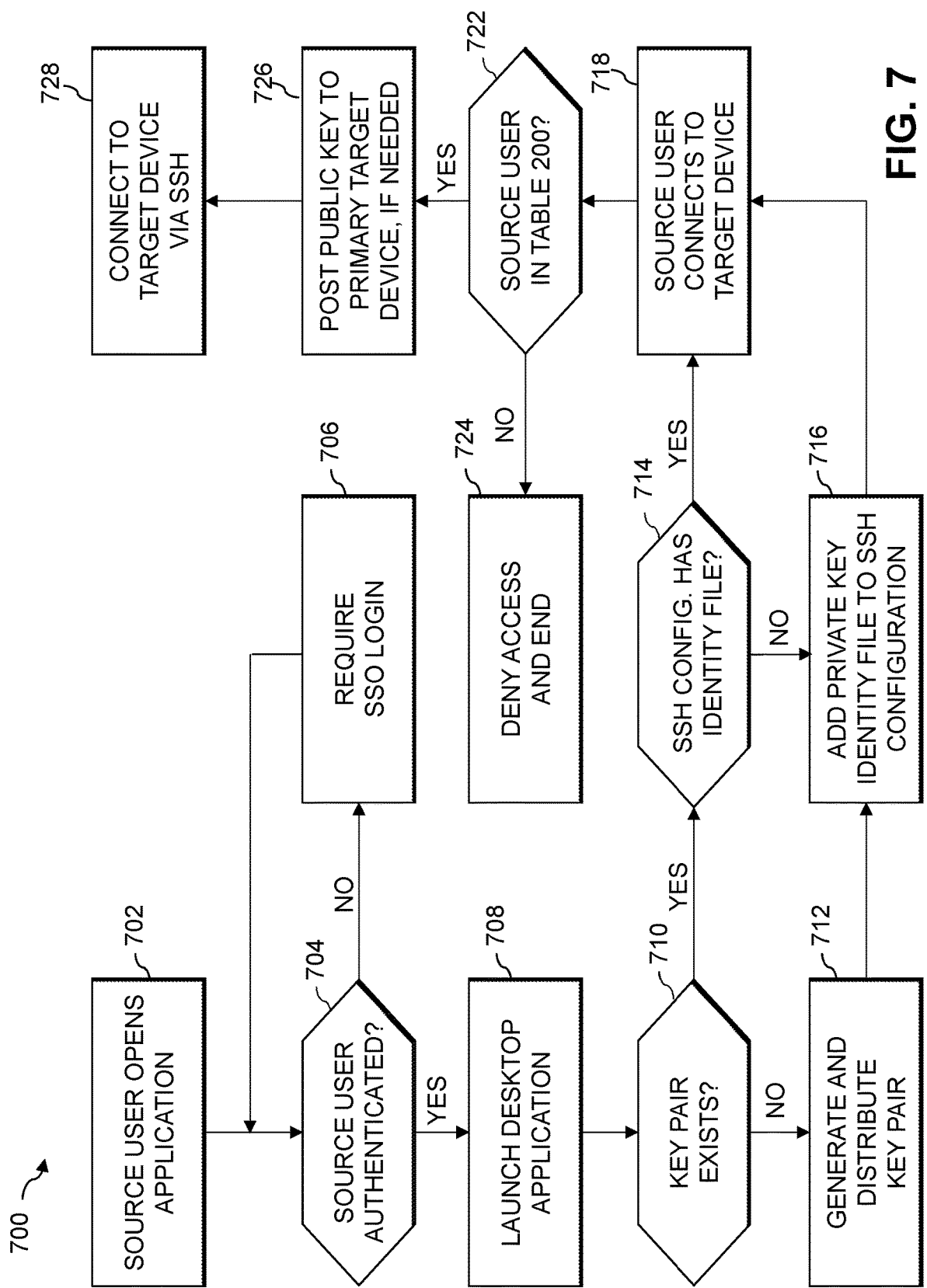
FIG. 7 is a flow chart illustrating an exemplary implementation of an automated remote device sharing process for accessing remote target devices using single sign-on techniques, in accordance with an illustrative embodiment.

FIG. 7 is a flow chart illustrating an exemplary implementation of an automated remote device sharing process 700 for accessing remote target devices using single sign-on techniques, according to an embodiment of the disclosure. As shown in FIG. 7, the exemplary automated remote device sharing process 700 is initiated during step 702 when a source user opens an application to launch the automated remote device sharing process 700.

A test is performed during step 704 to determine if the source user is authenticated. If it is determined during step 704 that the source user is not authenticated, the automated remote device sharing process 700 requires an SSO login during step 706. If it is determined during step 704 that the source user is authenticated, the automated remote device sharing process 700 launches the desktop application (e.g., desktop client 122) during step 708.

A further test is performed during step 710 to determine if a key pair exists for the desktop client 122. If it is determined during step 710 that a key pair exists for the desktop client 122, yet another test is performed during step 714 to determine if the SSH configuration file of the source user device 102 of the source user includes the identity file. If it is determined during step 714 that the SSH configuration file of the source user device 102 of the source user includes the identity file, program control proceeds to step 718, discussed further below. If it is determined during step 714 that the SSH configuration file of the source user device 102 of the source user does not include the identity file, program control proceeds to step 716, discussed further below.

If it is determined during step 710 that a key pair does not exist for the desktop client 122, then a key pair is generated and distributed (e.g., to the desired target device 103) during step 712. During step 716, the exemplary automated remote device sharing process 700 adds the private key as an identity file to the SSH configuration file of the source user device 102 of the source user.

During step 718, the source user attempts to connect the desired target device 103. A test is performed during step 722 to determine if the source user is listed in the authorized user table 200. If it is determined during step 722 that the source user is not listed in the authorized user table 200, then access is denied during step 724 and the process 700 ends.

If, however, it is determined during step 722 that the source user is listed in the authorized user table 200, then the public key of the source user device 102 of the source user is posted to the authorized keys file 300 for the source user on the primary target device 103-1, if needed, during step 726.

The exemplary automated remote device sharing process 700 then connects the source user device 102 to the desired target device 103 during step 728, for example, using the SSH protocol.

Figure 8:
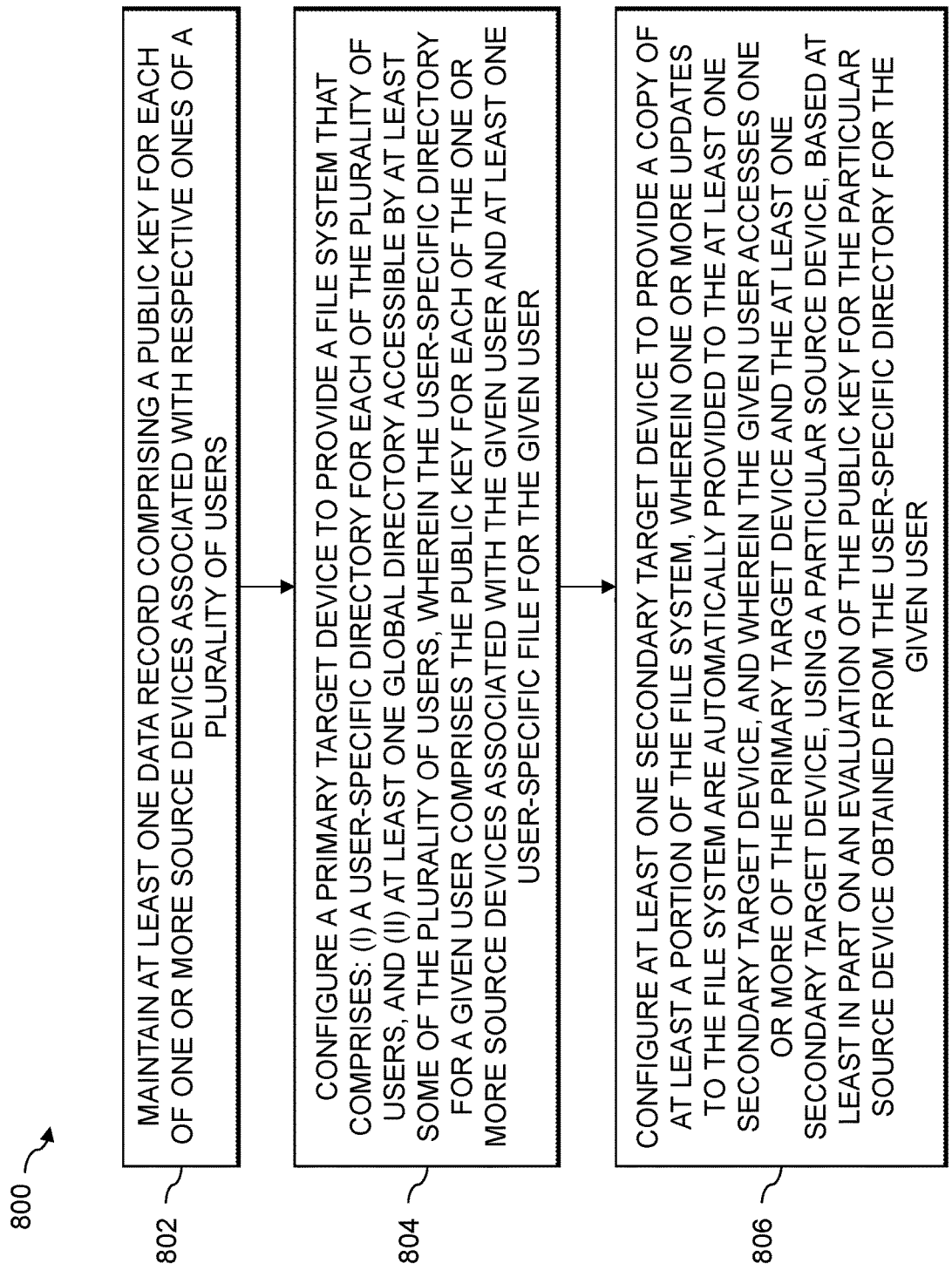
FIG. 8 is a flow chart illustrating an exemplary implementation of an automated remote device sharing process, in accordance with an illustrative embodiment.

FIG. 8 is a flow chart illustrating an exemplary implementation of an automated remote device sharing process 800, according to at least one embodiment of the disclosure. In the example of FIG. 8, the exemplary automated remote device sharing process 800 initially maintains at least one data record in step 802 comprising a public key for each of one or more source devices associated with respective ones of a plurality of users.

A primary target device is configured in step 804 to provide a file system that comprises: (i) a user-specific directory for each of the plurality of users, and (ii) at least one global directory accessible by at least some of the plurality of users, wherein the user-specific directory for a given user comprises the public key for each of the one or more source devices associated with the given user and at least one user-specific file for the given user.

At least one secondary target device is configured in step 806 to provide a copy of at least a portion of the file system, wherein one or more updates to the file system are automatically provided to the at least one secondary target device, and wherein the given user accesses one or more of the primary target device and the at least one secondary target device, using a particular source device, based at least in part on an evaluation of the public key for the particular source device obtained from the user-specific directory for the given user.

In some embodiments, an authorized user data record is maintained that identifies a plurality of authorized users and wherein the user-specific directory is automatically created in the file system for each of the plurality of authorized users. The one or more updates to the file system may be automatically provided to the at least one secondary target device using a network file system sharing tool.

In one or more embodiments, the at least one global directory accessible by the at least some of the plurality of users comprises one or more software development tools accessed by a plurality of software development users.

In at least one embodiment, one or more activities of the given user on one or more of the primary target device and the at least one secondary target device are automatically tracked separately from one or more activities of at least one additional user. The one or more activities of the given user may be automatically tracked, for example, using a logging script executed on the primary target device and the at least one secondary target device to capture activities of each active user since a prior log event.

In addition, one or more updates made to at least one copy of the file system maintained by the at least one secondary target device may be automatically reflected in the file system maintained by the primary target device. Authentication of the particular source device may be performed using a single sign-on service.

The particular processing operations and other network functionality described in conjunction with the pseudo code of FIGS. 5 and 6 and the flow diagrams of FIGS. 7 and 8 are presented by way of illustrative example only, and should not be construed as limiting the scope of the disclosure in any way. Alternative embodiments can use other types of processing operations to manage keys for shared remote devices using a single sign-on. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the public/private key pairs 124 of the source user devices 102 can be changed periodically (in a similar manner as changing passwords). The public/private key pairs 124 of the source user devices 102 can be changed automatically by the desktop client 122, in one or more embodiments, by deleting the local public/private key pair 124 so that the desktop client 122 regenerates a new public/private key pair 124.

In some embodiments, the disclosed automated sharing of remote devices by multiple users using a file system includes an ability to generate a public/private key pair on a number of operating systems and to pass a public key of a given source user device 102 to a web client 112 for distribution to any number of target devices 103.

Among other benefits, the disclosed key management techniques include the distribution of public keys of source user devices 102 to target devices 103. In other words, once the disclosed key management platform has authenticated an authorized source user (e.g., using an SSO authentication), the public key of the source user device 102 device that the authorized source user is working on can be automatically distributed to all target devices 103 by means of the automated replication of the primary file system 132 comprising the user home directories 150 (with the authorized keys file for each user) and the global directory 155.

In this manner, the source user does not need outside help to distribute public keys, and the source user does not have to configure multiple source user devices 102. The disclosed automated remote device sharing techniques for accessing shared remote devices add security to the key distribution process in some embodiments by requiring a single sign-on authentication and/or the use of user-specific credentials.

In addition, the disclosed automated sharing of remote devices by multiple users using a file system improves security in some embodiments by requiring users to authenticate using their own credentials and separately logging the actions of each user separately.

One or more embodiments of the disclosure provide improved methods, apparatus and computer program products for automated sharing of remote devices by multiple users using a file system. The foregoing applications and associated embodiments should be considered as illustrative only, and numerous other embodiments can be configured using the techniques disclosed herein, in a wide variety of different applications.

It should also be understood that the disclosed key management techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for automated sharing of remote devices by multiple users using a file system may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services may be provided for users under a PaaS model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based key management engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based key management platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
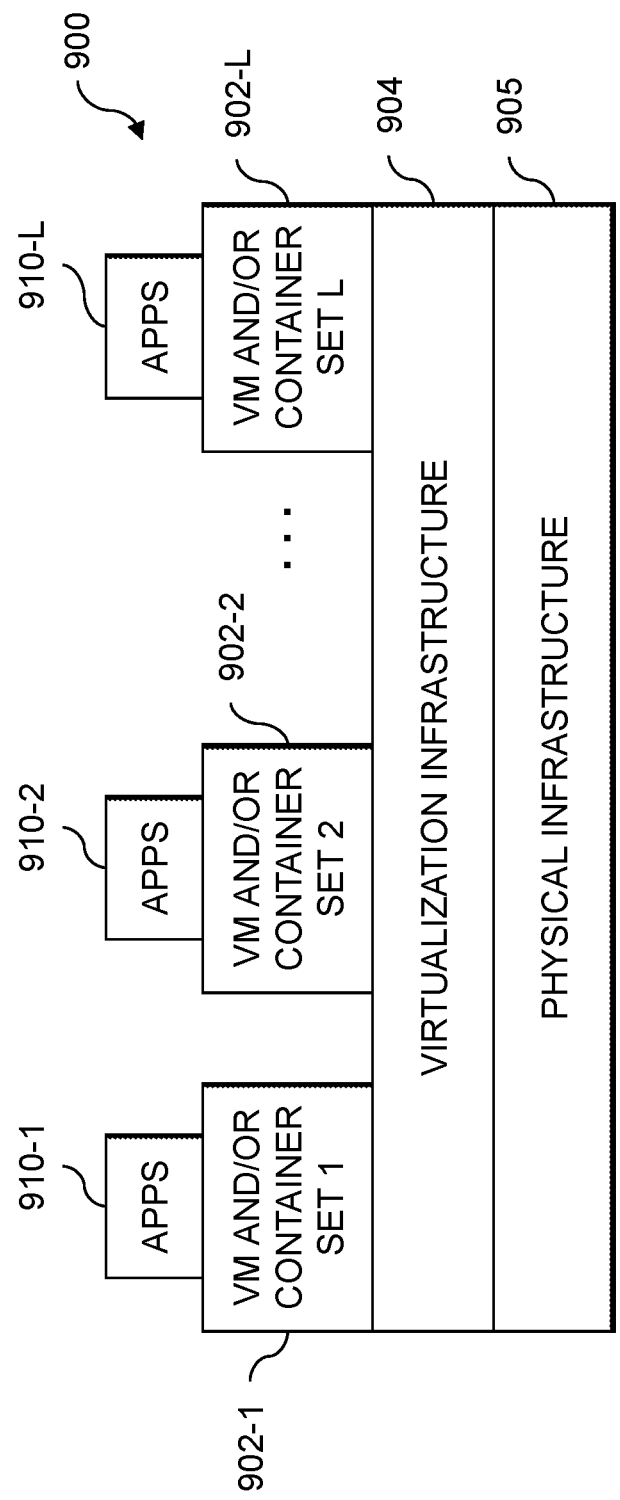
FIG. 9 illustrates an exemplary processing platform that may be used to implement at least a portion of one or more embodiments of the disclosure comprising a cloud infrastructure.

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide key management functionality of the type described above for one or more processes running on a given one of the VMs. For example, each of the VMs can implement automated remote device sharing control logic and associated single sign-on authentication for providing key management functionality for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide key management functionality of the type described above for one or more processes running on different ones of the containers. For example, a container host device supporting multiple containers of one or more container sets can implement one or more instances of automated remote device sharing control logic and associated single sign-on authentication for providing key management functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a WAN, a LAN, a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an ASIC, an FPGA or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Figure 10:
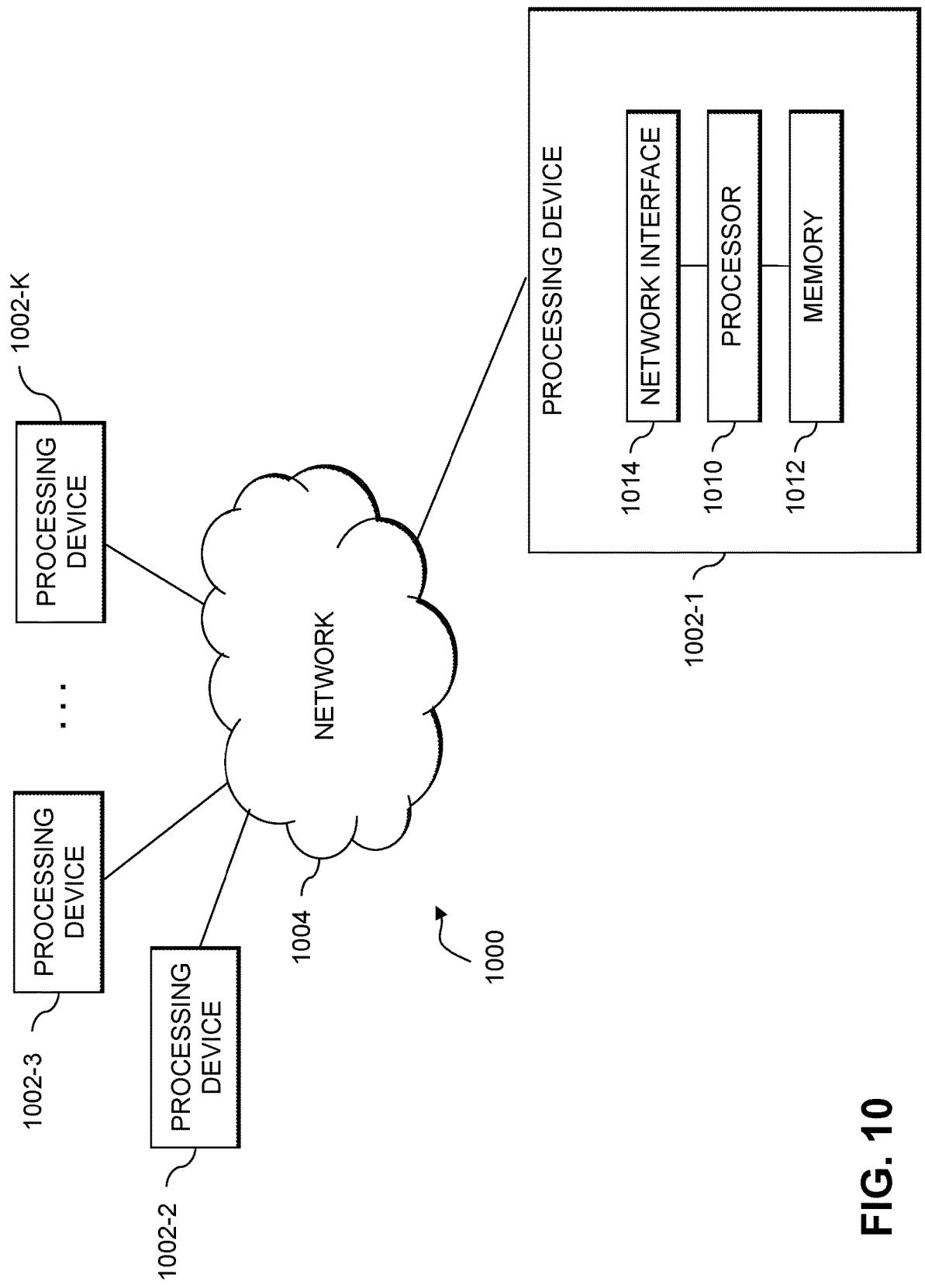
FIG. 10 illustrates another exemplary processing platform that may be used to implement at least a portion of one or more embodiments of the disclosure.

Multiple elements of an information processing system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
maintaining at least one data record comprising a public key for each of one or more source devices associated with respective ones of a plurality of users;
configuring a primary target device to provide a file system that comprises: (i) a user-specific directory for each of the plurality of users, and (ii) at least one global directory accessible by at least some of the plurality of users, wherein the user-specific directory for a given user comprises the public key for each of the one or more source devices associated with the given user and at least one user-specific file for the given user; and
configuring at least one secondary target device to provide a copy of at least a portion of the file system, wherein one or more updates to the file system are automatically provided to the at least one secondary target device, and wherein the given user accesses one or more of the primary target device and the at least one secondary target device, using a particular source device, based at least in part on an evaluation of the public key for the particular source device obtained from the user-specific directory for the given user;
wherein the method is performed by at least one processing device comprising a processor coupled to a memory.

2. The method of claim 1, further comprising maintaining an authorized user data record that identifies a plurality of authorized users and wherein the user-specific directory is automatically created in the file system for each of the plurality of authorized users.

3. The method of claim 1, wherein the one or more updates to the file system are automatically provided to the at least one secondary target device using a network file system sharing tool.

4. The method of claim 1, wherein the at least one global directory accessible by the at least some of the plurality of users comprises one or more software development tools accessed by a plurality of software development users.

5. The method of claim 1, wherein one or more activities of the given user on one or more of the primary target device and the at least one secondary target device are automatically tracked separately from one or more activities of at least one additional user.

6. The method of claim 5, wherein the one or more activities of the given user are automatically tracked using a logging script executed on the primary target device and the at least one secondary target device to capture activities of each active user since a prior log event.

7. The method of claim 1, wherein one or more updates made to at least one copy of the file system maintained by the at least one secondary target device are automatically reflected in the file system maintained by the primary target device.

8. The method of claim 1, further comprising authenticating the particular source device using a single sign-on service.

9. An apparatus comprising:
at least one processing device comprising a processor coupled to a memory;
the at least one processing device being configured to implement the following steps:
maintaining at least one data record comprising a public key for each of one or more source devices associated with respective ones of a plurality of users;
configuring a primary target device to provide a file system that comprises: (i) a user-specific directory for each of the plurality of users, and (ii) at least one global directory accessible by at least some of the plurality of users, wherein the user-specific directory for a given user comprises the public key for each of the one or more source devices associated with the given user and at least one user-specific file for the given user; and
configuring at least one secondary target device to provide a copy of at least a portion of the file system, wherein one or more updates to the file system are automatically provided to the at least one secondary target device, and wherein the given user accesses one or more of the primary target device and the at least one secondary target device, using a particular source device, based at least in part on an evaluation of the public key for the particular source device obtained from the user-specific directory for the given user.

10. The apparatus of claim 9, further comprising maintaining an authorized user data record that identifies a plurality of authorized users and wherein the user-specific directory is automatically created in the file system for each of the plurality of authorized users.

11. The apparatus of claim 9, wherein the one or more updates to the file system are automatically provided to the at least one secondary target device using a network file system sharing tool.

12. The apparatus of claim 9, wherein the at least one global directory accessible by the at least some of the plurality of users comprises one or more software development tools accessed by a plurality of software development users.

13. The apparatus of claim 9, wherein one or more activities of the given user on one or more of the primary target device and the at least one secondary target device are automatically tracked separately from one or more activities of at least one additional user.

14. The apparatus of claim 9, further comprising authenticating the particular source device using a single sign-on service.

15. A non-transitory processor-readable storage medium having stored therein program code of one or more software programs, wherein the program code when executed by at least one processing device causes the at least one processing device to perform the following steps:
maintaining at least one data record comprising a public key for each of one or more source devices associated with respective ones of a plurality of users;
configuring a primary target device to provide a file system that comprises: (i) a user-specific directory for each of the plurality of users, and (ii) at least one global directory accessible by at least some of the plurality of users, wherein the user-specific directory for a given user comprises the public key for each of the one or more source devices associated with the given user and at least one user-specific file for the given user; and
configuring at least one secondary target device to provide a copy of at least a portion of the file system, wherein one or more updates to the file system are automatically provided to the at least one secondary target device, and wherein the given user accesses one or more of the primary target device and the at least one secondary target device, using a particular source device, based at least in part on an evaluation of the public key for the particular source device obtained from the user-specific directory for the given user.

16. The non-transitory processor-readable storage medium of claim 15, further comprising maintaining an authorized user data record that identifies a plurality of authorized users and wherein the user-specific directory is automatically created in the file system for each of the plurality of authorized users.

17. The non-transitory processor-readable storage medium of claim 15, wherein the one or more updates to the file system are automatically provided to the at least one secondary target device using a network file system sharing tool.

18. The non-transitory processor-readable storage medium of claim 15, wherein the at least one global directory accessible by the at least some of the plurality of users comprises one or more software development tools accessed by a plurality of software development users.

19. The non-transitory processor-readable storage medium of claim 15, wherein one or more activities of the given user on one or more of the primary target device and the at least one secondary target device are automatically tracked separately from one or more activities of at least one additional user.

20. The non-transitory processor-readable storage medium of claim 15, further comprising authenticating the particular source device using a single sign-on service.

* * * * *